Oct. 23, 1945.  S. D. SEWELL  2,387,535
FEEDER HEAD FOR HAY BALERS
Filed June 7, 1944  3 Sheets-Sheet 3
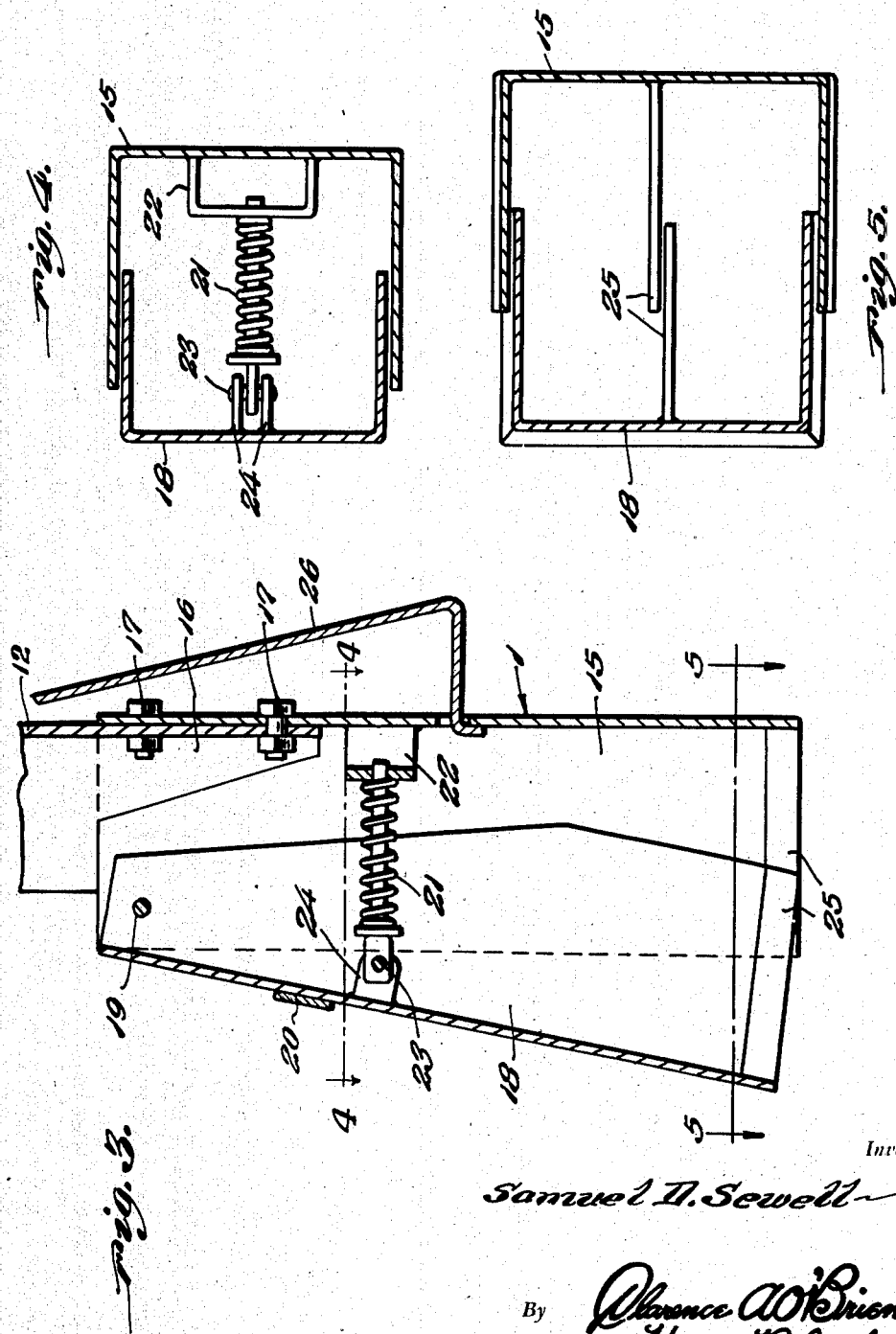

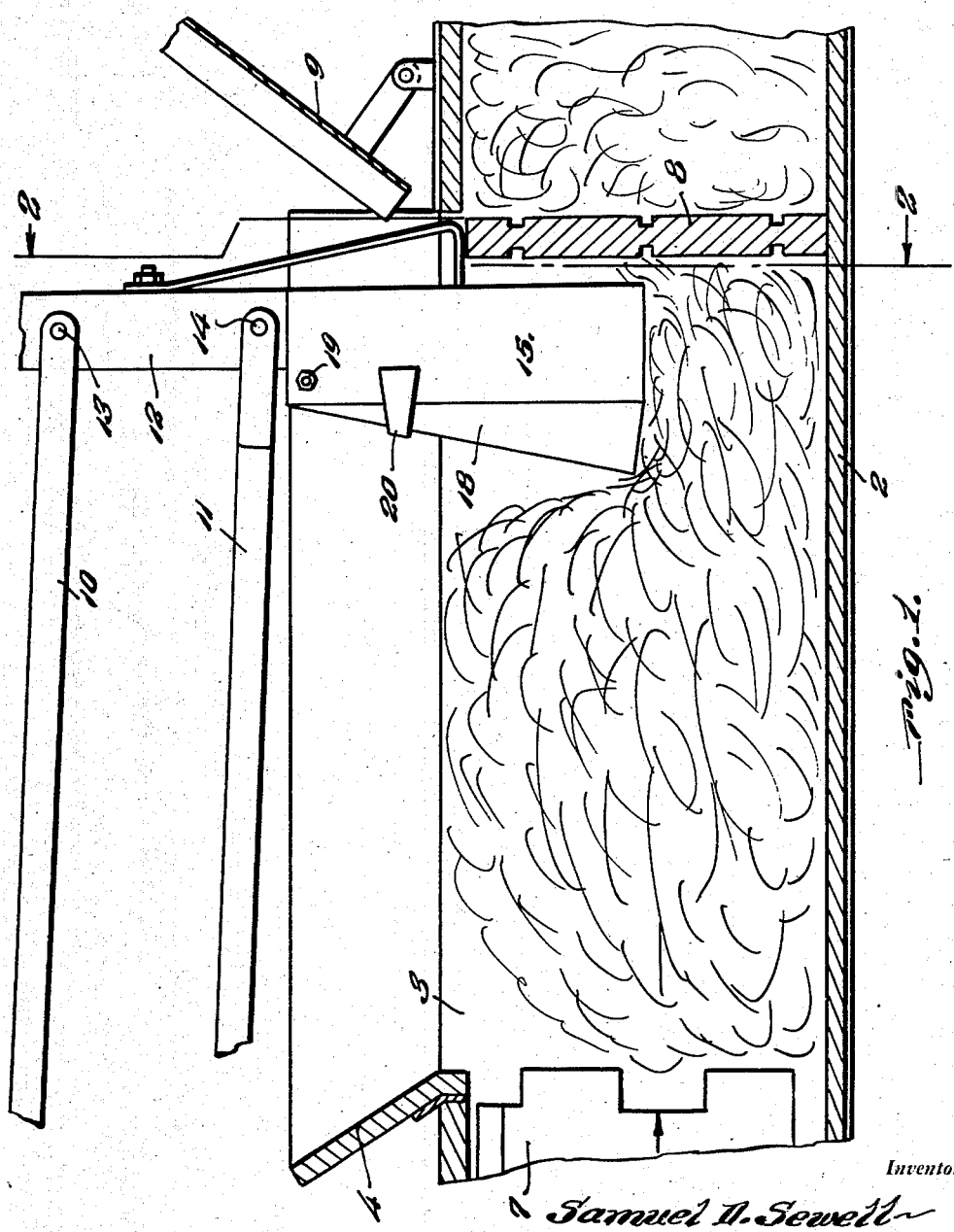

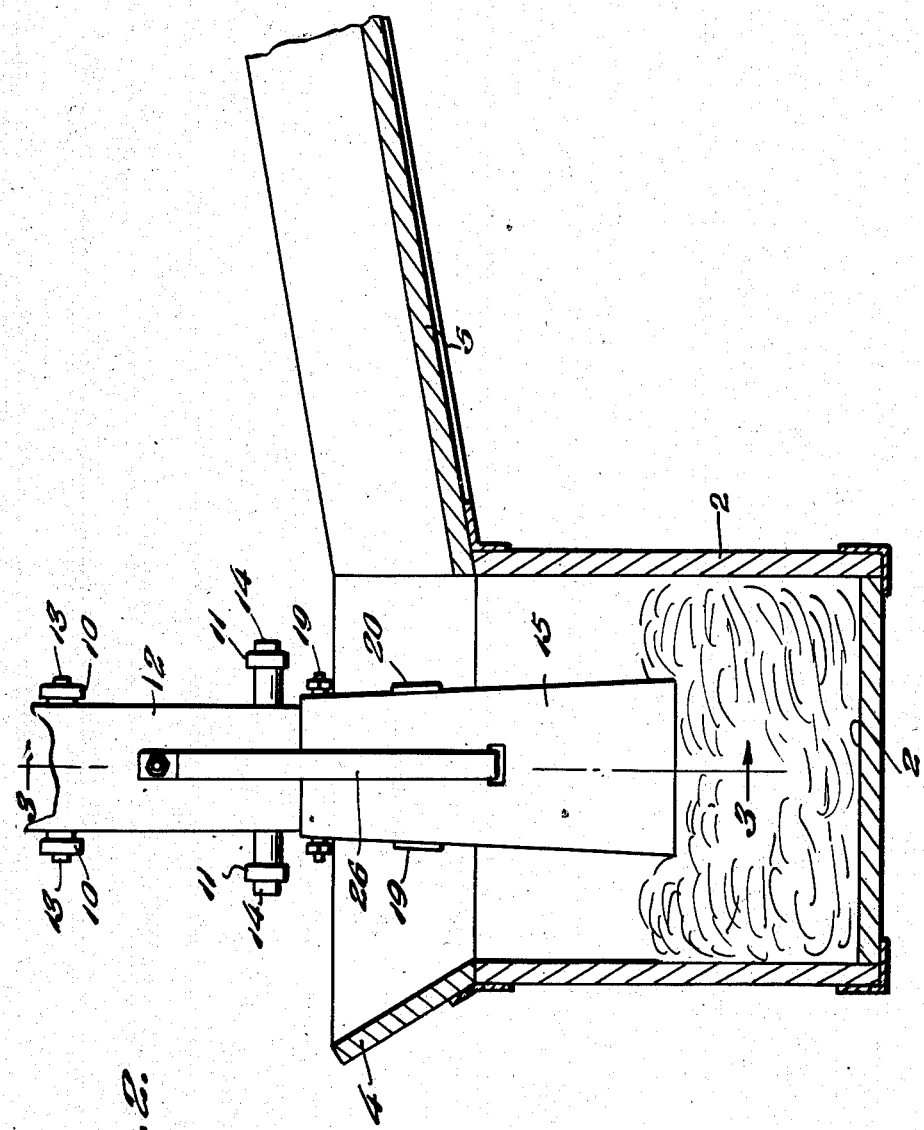

Patented Oct. 23, 1945

2,387,535

UNITED STATES PATENT OFFICE 2,387,535

FEEDER HEAD FOR HAY BALERS

Samuel D. Sewell, Wanette, Okla.

Application June 7, 1944, Serial No. 539,072

1 Claim. (Cl. 100—25)

My invention relates generally to hay balers of the commercially designated power press type, and more particularly to improvements in feeder heads, or tampers, therefor.

The primary object of my invention is to provide a feeder head, or tamper, of greater efficiency than present day feeder heads and particularly as regards compression of hay fed into the baling chamber of hay balers, and which is especially adapted to facilitate its retraction after the compression stroke, all without materially increasing the cost of manufacture of such heads or complicating the structure thereof.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a fragmentary view partly in longitudinal section and partly in side elevation illustrating my improved feeder head, or tamper, embodied in a hay baler, Figure 2 is a view in vertical transverse section taken on the line 2—2 of Figure 1, Figure 3 is a view in vertical section taken on the line 3—3 of Figure 2 and drawn to an enlarged scale, Figure 4 is a view in transverse section taken on the line 4—4 of Figure 3.

Figure 5 is a similar view taken on the line 5—5 of Figure 3.

Referring to the drawings by numerals, my improved feeder head, designated generally by the numeral 1, has been illustrated therein as forming part of the equipment of a well known type of hay baler of the power press type illustrated, in part, as sufficient for the present purposes, the numeral 2 designating the usual trough-like body forming an open top compression, or baling, chamber 3, open at both ends, and into which hay is fed through a hopper 4 surmounting said chamber 3, and from a side feed table 5. The usual well known type of power-operated, reciprocating plunger head 7 operates in such balers to compress hay in said chamber 3 between said head and a block 8, such blocks being fed into said chamber 3 at the discharge end of the chamber by a block feeding mechanism shown generally at 9. As will be understood, a bale compressed and built up in the compression chamber 3 is forced, as it is built up and compressed, through and out of the discharge end of the chamber. In this type of baler, the feeder head is thrust downwardly into the compression chamber 3, through the top thereof, to tamp hay down in said chamber and then elevated out of the chamber all in properly timed relation to reciprocation of the plunger head 2, and by means of upper and lower, vertically rocking levers 10, 11, forming a parallel link motion and power operated, by means not shown, to raise and lower, endwise, an upright head-carrying channel bar 12 to which said levers 10, 11 are pivoted, at one end, as at 13, 14.

The feeder head 1, according to my invention, comprises an upright, elongated, rectangular main section 15 of channel form suspended from and fixed to the lower end of the bar 12 with the open side thereof facing the plunger head 7. As one means of securing the main section 15 to said bar 12, the upper end of said section is fitted over a reduced lower tongue 16 on said bar and bolted to said tongue, as at 17.

A swingable channel head section 18 is fitted in the open side of the main section 15 with its open side innermost and pivoted at its upper end to the sides of said main section 15, as at 19, to swing outwardly and inwardly of said main section. As best shown in Figure 3, the swingable section 18 is coextensive in length with the main section 15. A stop yoke 20 of strap metal having its ends welded to the sides of the main section 15 so that said yoke spans the swingable section 18 limits outward swinging of said section 18.

A horizontal, spring-loaded thrust rod 21 within the head 1, having one end slidable in a U bracket 22 fixed to the closed back of the main section 15 and its other end pivoted, as at 23, to a pair of ears 24 on the closed front of the swingable section 18, opposes swinging of the swingable section inwardly of the main section 15.

A pair of parallel tamping bars 25 extending from the back of the main section 15 and the front of the swingable section 18, side by side, at the lower ends of said sections, form together with the lower ends of said sections a skeleton tamping structure on said head 1.

The usual, well understood, block knocker 26 is provided on the rear side of the main section 15 and which forms, per se, no part of the present invention and therefore need merely be identified in passing.

As will now be seen, the described feeder head 1 provides a pair of relatively fixed and swingable sections which flare downwardly, normally, to form a tamping structure of greater width, in the line of feed of the hay through the baling chamber 2, than the usual feeder head so that the efficiency of the feeder head is increased. The section 18 being swingable inwardly of the section 15 is adapted to yield so as to obviate, or reduce, resistance to movement of the compression head 7 in its compression stroke, and facilitates elevation of the head 1 out of the hay which has been tamped in the compression chamber 2.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A feeder head for hay balers comprising an elongated substantially rectangular main section of channel form to provide an open side therefor, a second channel section of substantially the same length as the main section and fitting in the open side of the main section with the channel facing said open side, said second section being pivoted at one end in one end of the main section to swing into and out of the main section, and means interposed between said sections for yieldingly opposing swinging of said second section into the main section, the other ends of said sections forming tamping edges for pressing down hay in a baler, and a pair of tamping bars each fixed at one end to one of said sections at said other ends thereof and extending side by side transversely of the sections to supplement said tamping edges.

SAMUEL D. SEWELL.